(12) United States Patent
Suryadi (10) Patent No.: US 10,185,706 B2
(45) Date of Patent: Jan. 22, 2019

(54) GENERATING WEB BROWSER VIEWS FOR APPLICATIONS

(71) Applicant: Dicky Suryadi, San Diego, CA (US)

(72) Inventor: Dicky Suryadi, San Diego, CA (US)

(73) Assignee: AKTIEBOLAGET SKF, Gothenburg (SE)

( * ) Notice: Subject to any disclaimer, the term of this patent is extended or adjusted under 35 U.S.C. 154(b) by 365 days.

(21) Appl. No.: 14/512,002

(22) Filed: Oct. 10, 2014

(65) Prior Publication Data

US 2016/0103814 A1    Apr. 14, 2016

(51) Int. Cl.
| | |
|---|---|
| G06F 3/048 | (2013.01) |
| G06F 17/24 | (2006.01) |
| G06F 17/21 | (2006.01) |
| G06F 17/30 | (2006.01) |
| G06F 8/73 | (2018.01) |

(52) U.S. Cl.
CPC .............. *G06F 17/241* (2013.01); *G06F 8/73* (2013.01); *G06F 17/212* (2013.01); *G06F 17/30893* (2013.01)

(58) Field of Classification Search
CPC ............. G06F 17/241; G06F 17/30887; G06F 17/30896; G06F 17/30905; H04L 67/02; H04L 67/04
See application file for complete search history.

(56) References Cited

U.S. PATENT DOCUMENTS

| | | | |
|---|---|---|---|
| 7,904,803 B2 * | 3/2011 | Coulthard | ......... G06F 17/30893 |
| | | | 715/234 |
| 8,544,027 B2 | 9/2013 | Demant et al. | |
| 8,671,417 B2 | 3/2014 | Ickman et al. | |
| 8,788,627 B2 | 7/2014 | Addala | |
| 2003/0005181 A1 * | 1/2003 | Bau, III | ..................... G06F 8/34 |
| | | | 719/330 |
| 2006/0059422 A1 | 3/2006 | Ting-Hu et al. | |
| 2007/0208686 A1 * | 9/2007 | Gupta | ................. H04L 67/2823 |
| 2011/0035435 A1 * | 2/2011 | Meng | ........................ G06F 9/54 |
| | | | 709/203 |

(Continued)

FOREIGN PATENT DOCUMENTS

WO    2007038352 A2    4/2007

OTHER PUBLICATIONS

Ji Myong NHO (Authorized Officer), International Search Report and Written Opinion dated Jan. 22, 2016, PCT Application No. PCT/US2015/054225, filed Oct. 6, 2015, pp. 1-10.

*Primary Examiner* — Andrew T Chiusano
(74) *Attorney, Agent, or Firm* — Bryan Peckjian; SKF USA Inc. Patent Dept.

(57) ABSTRACT

A system and method for generating a web browser view of a desktop application. The system and method can include obtaining source code for the desktop application, where the source code includes various properties, determining annotations associated with the one or more properties, where the annotations describe display properties for the one or more properties, and generating the web browser view with the display properties based on the annotations. The system and method can also include receiving input from a user via the web browser view, performing backend logic based on the input and the source code where the backend logic results in a change in a view, and updating the web browser view based on the change in the view.

22 Claims, 4 Drawing Sheets

(56) References Cited

U.S. PATENT DOCUMENTS

| | | | | |
|---|---|---|---|---|
| 2011/0231784 A1* | 9/2011 | Meng | ............... | G06F 8/38 |
| | | | | 715/762 |
| 2011/0239127 A1* | 9/2011 | Meng | ............... | G06F 8/70 |
| | | | | 715/747 |
| 2011/0321010 A1* | 12/2011 | Wang | ............... | G06F 9/443 |
| | | | | 717/116 |
| 2012/0150939 A1* | 6/2012 | Zaifman | ............... | G06F 9/45512 |
| | | | | 709/203 |
| 2012/0166963 A1* | 6/2012 | Kohli | ............... | G06F 9/44 |
| | | | | 715/744 |
| 2013/0185240 A1* | 7/2013 | Ward | ............... | G06F 8/34 |
| | | | | 706/47 |
| 2013/0275848 A1 | 10/2013 | Neagu et al. | | |
| 2014/0019847 A1 | 1/2014 | Telerik | | |
| 2015/0286691 A1* | 10/2015 | Olenick | ............... | G06F 3/0482 |
| | | | | 715/811 |
| 2016/0103815 A1* | 4/2016 | Suryadi | ............... | G06F 17/241 |
| | | | | 715/230 |

\* cited by examiner

FIG. 1

```
                                                    ┌202                        ┌200
public class UserViewModel : BaseViewModel
{                               ┌204
    [ViewField( typeof( TextBox ) )]
    public string Name { get; set; }
                                ┌206
    [ViewField( typeof( CheckBox ) )]
    public bool ProvideMailingAddress { get; set; }
                                                                            ┌208
    [ViewField( typeof( TextBox ), IsEnabled = "ProvideMailingAddress" )]
    public string MailingAddress { get; set; }
}

┌210
public class MyForm : BaseForm
{
    public MyForm() { Add_View_Model( UserViewModel ); }
}
```

GENERATING WEB BROWSER VIEWS FOR APPLICATIONS

TECHNICAL FIELD

The present disclosure relates generally to methods, systems, and computer-readable media for automatically generating a web browser view for non-web browser based applications.

BACKGROUND

The growth of cloud computing has increased pressure for software businesses that produce traditional desktop applications to deliver their products via web or mobile platforms. Using traditional frameworks, developers would have to re-write much of their existing desktop software code to run on a web or mobile platform. Additionally, developers generally need to re-tool their resources to support web development.

In some cases, such re-writing and re-tooling may require retraining and/or hiring new personnel, since most code written for desktop applications uses different programming languages/environments than those employed for web or mobile platforms.

Accordingly, software development technologies may benefit from improved techniques of generating web or mobile views based on source code from desktop applications.

SUMMARY

The present disclosure relates generally to methods, systems, and computer readable media for providing these and other improvements to software development technologies.

Implementations of the present teachings relate to systems, methods, and computer-readable media for generating web browser views of desktop applications. In some embodiments, a computing device can obtain source code for the desktop application, where the source code includes various properties. The computing device can determine annotations associated with the one or more properties, where the annotations describe display properties for the one or more properties. Based on the annotations, the computing device can generate the web browser view with the display properties.

In further embodiments, the computing device can receive input from a user via the web browser view, perform backend logic based on the input and the source code where the backend logic results in a change in a view, and update the web browser view based on the change in the view.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Figure 1:
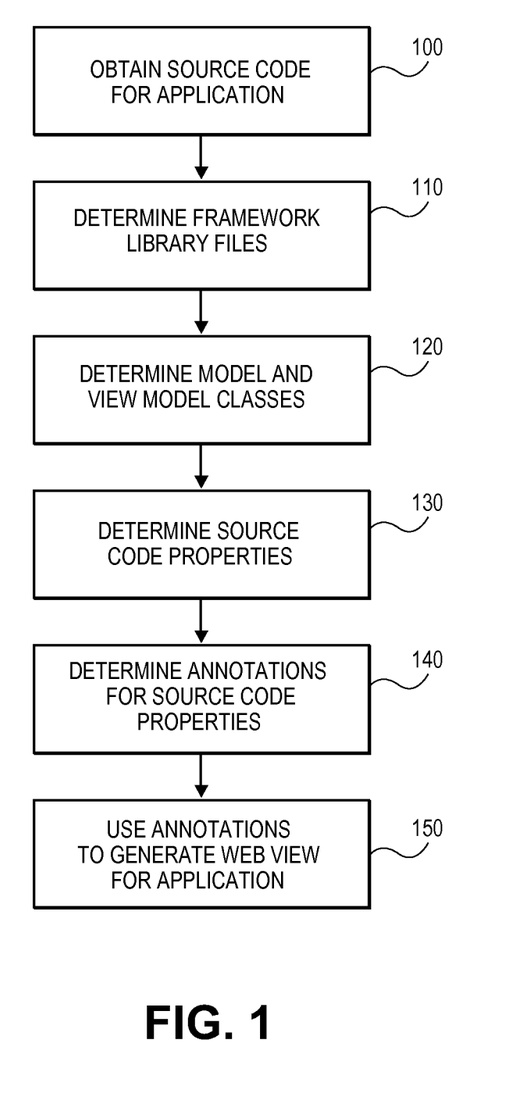
FIG. 1 is a flow diagram illustrating a method of generating a web browser view from a desktop application, consistent with certain disclosed embodiments.

FIG. 1 is a flow diagram illustrating a method of generating a web browser view from a desktop application, consistent with certain disclosed embodiments. The process can begin in 100 when a computing device obtains source code for an application. The source code can be source code written in a specific language and/or written using functionality provided by a software framework. The application may, in an embodiment, be a desktop application intended to run on a general purpose computer. As used herein, a "desktop application" includes any type of software application that excludes web applications/documents.

In some embodiments, the source code can be written using the functionality of the .NET Framework and/or the ASP .NET Framework provided by the Microsoft Corporation. In other embodiments, different software frameworks can be utilized.

In 110, the computing device can determine framework library files that may be employed to run the application. In some embodiments, the computing device can determine the framework library files based on the source code. For example, the computing device can determine any framework library files imported by the source code and/or the computing device can determine one or more framework library files based at least partially on annotations included in the source code.

In 120, the computing device can determine model classes and view model classes in the application. Model classes can represent the business logic or backend logic. As used herein, backend logic can refer to the backend processing performed by a computing device that can, in embodiments, be performed on a computing device that is different from a computing device displaying a web browser view. View model classes can represent presentation logic. In some embodiments, the computing device can determine the model and view model classes based on the source code. For example, the computing device can determine the model and view model classes based on annotations included in the source code.

View model classes can be specifically included in a base view derived class to indicate that the view model class will be displayed in a web view. In some embodiments, view model classes can inherit from a base view model class. Additionally, annotations included in the source code can specify how each view model class property will appear on a view, and how data binding behavior will perform. Data binding can define how input from a user using the web browser view will affect the business logic and can result in a change in the web browser view based on the user's input.

In 130, the computing device can determine source code properties. For example, properties can be variables (e.g. strings, integers, Boolean values, etc.) used in view model classes.

In 140, the computing device can determine annotations in the source code. As used herein, an annotation is human-readable text within the source code that is part of the framework syntax, but not present in the original desktop application source code. The annotations are added in the source code as part of the process of re-tooling the source code to support the web browser view. In some embodiments, the underlying technology of the annotations itself can be supported by the programming language of the source code, and processed by its compiler.

The annotations can specify how one or more properties are displayed, how input from a user is received, and additional logic on how the display will be updated based on the user input. Additionally, the annotations can include a class that inherits from a framework base class to specify a Uniform Resource Locator (URL) address for a client browser to get and display the views of the view models.

In some embodiments, annotations can be associated with properties based on proximity to the invocation of the property in the source code, position relative to the invocation of the property in the source code (e.g. immediately before or immediately after), and/or by referencing the property.

In 150, the computing device can generate a web browser view for the application using the source code and the annotations. In some embodiments, the computing device can generate a HyperText Markup Language (HTML) document and/or HTML code to display a web browser view of the application. Display elements can be created based on the determined source code properties, models, and annotations.

In some embodiments, a user on a client device can open a browser and type in the URL address into the client browser. The generated HTML document can be transferred to the client device, and the client device can display the HTML document via a web browser. The computing device can receive input via the HTML document from the user, and can perform any business logic or backend logic and/or update the view based on the input from the user, operations of the source code, and/or the annotations.

For example, a property can be bound to a backend process, and when a user provides input associated with the property into the web browser, the computing device can perform the backend process and update the HTML document and/or the web browser view accordingly.

While the steps depicted in FIG. 1 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. For example, 110-140 can be performed in any order or as a single step (i.e. compiling the source code). Further, the steps described are not intended to be exhaustive or absolute, and various steps can be inserted or removed.

Figure 2:
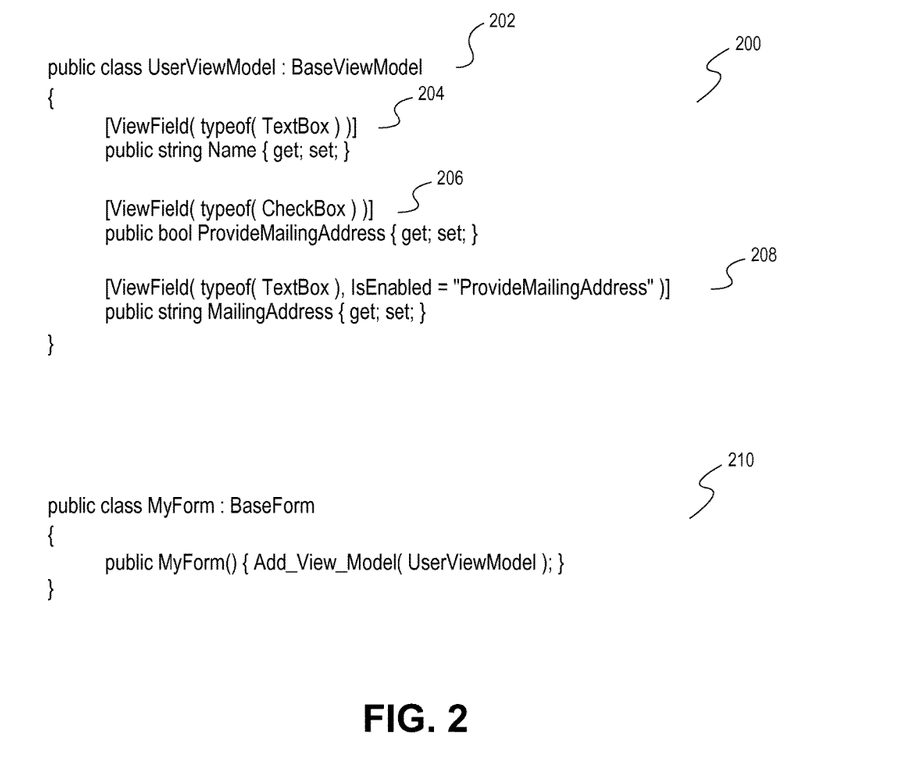
FIG. 2 is a diagram illustrating pseudo-code of a desktop application that includes annotations for generating a web browser view, consistent with certain disclosed embodiments.

FIG. 2 is a diagram illustrating exemplary pseudo-code of a desktop application that includes annotations for generating a web browser view, consistent with certain disclosed embodiments. Pseudo-code 200 can represent a simplified example of code that is obtained by the computing device in 100 as shown in FIG. 1.

Line 202 can include an annotation "BaseViewModel." The annotation can indicate that the class UserViewModel will be displayed using a view model titled BaseViewModel. For example, the view model BaseViewModel can be provided by a framework such as, for example, the Model View ViewModel (MVVM) framework. In other embodiments, the UserViewModel can be specifically included in a base view derived class, which can indicate that the UserViewModel will be displayed in a web view.

Line 204 can be an annotation associated with the string Name. The annotation can indicate that the string Name can be associated with a text box in the view model. Accordingly, for example, the generated HTML can include a text box, and the text box can be populated with text from the string Name and/or the string Name can be updated based on input from the user into the text box.

Line 206 can be an annotation associated with the Boolean value ProvideMailingAddress. The annotation can indicate that the Boolean value ProvideMailingAddress can be associated with a check box in the view model. Accordingly, the generated HTML can include a check box, and the check box can be populated based on the Boolean value ProvideMailingAddress (e.g., checked if value is 1, unchecked if value is 0) and/or the Boolean value ProvideMailingAddress can be updated based on input from the user corresponding to the check box.

Line 208 can be an annotation associated with the string MailingAddress. Additionally, the annotation can be bound to the Boolean value ProvideMailingAddress. The annotation can indicate that the string MailingAddress can be associated with a text box in the view model. Accordingly, the generated HTML can include a text box, and the text box can be populated based on the string MailingAddress and/or the string MailingAddress can be updated based on input from the user corresponding to the text box.

In some embodiments, the segment of the annotation 'IsEnabled="ProvideMailingAddress"' can indicate that the text box may only be displayed if the Boolean value ProvideMailingAddress is "enabled" (e.g. equals 1). Accordingly, the annotation is bound to the Boolean value ProvideMailingAddress. In some embodiments, HTML that includes the text box for the string MailingAddress may only be generated and/or provided to the web browser of the user if the Boolean value ProvideMailingAddress is enabled.

Code segment 210 can represent a class MyForm that inherits from a framework base class. In some embodiments, such a class can be used to specify a URL address for a client browser to get and display the views of the view models. For example, the code segment allows for a client browser to get and display views of the UserViewModel view model.

The pseudo-code depicted in FIG. 2 represents a simplified version of source code that can be utilized, as described herein. The programming language, the operations, the properties, and the format of the annotations depicted are merely for the purpose of illustration and are not intended to be limiting.

For the purpose of illustration, a non-limiting list of possible annotations, properties of the annotations, and their descriptions are provided below. Different annotations, properties of annotations, and formats thereof may be utilized, consistent with certain disclosed embodiments.

The annotation ViewField can define the appearance and behavior of the properties in a view model. Different properties of the annotation ViewField include, but are not limited to the following properties:

Control type—The type of control to display on the view. Possible values include: TextBox, PasswordBox, CheckBox, ComboBox (drop-down list), DatePicker, RadioButton, Label, ListView, TreeView, ToggleButton, ToolBox, and ContentControl.

CaptionResourceId—String resource identifier for the control's caption or prompt.

EndCaptionResourceId—String resource identifier for any caption that follows the control.

OptionsCaptionResourceId—String resource identifier for the prompt on the combobox for a user to make a selection.

Order—Positioning order of the control on the view.

StyleClass—Name that identifies a Cascading Style Sheets (css) style class to apply to the control.

IconResourceId—Image resource identifier for any icon that accompanies the control.

IsEnabled—Name of another view model property of type Boolean that will enable/disable this control based on its value.

IsVisible—Name of another view model property of type of Boolean that will show/hide this control based on its value.

ItemKey—Applies to view model properties that contain a collection of items. This specifies the name of the property of an item that can uniquely identify that item in the collection.

ItemName—Applies to view model properties that contain a collection of items. This specifies the name of the property of an item that will be used for the display name for that item on the view.

ItemsSource—Applies to view model properties that contain hierarchical (tree) structures. This specifies the name of the property of a tree item that contains a collection of children items.

ItemValue—Applies to view model properties that contain a collection of items. This specifies the name of the property of an item that will be used to store a value change on the item.

PlaceAfter—Name of the view model property associated with the control where this control will be placed after on the same line.

SelectedItem—Applies to view model properties that contain a collection of selectable items. This specifies the name of a view model property that will receive the item that is selected on the view.

IsItemChecked—Applies to view model properties that contain hierarchical (tree) structures. This specifies the name of an item property of type Boolean that indicates whether the item's check state is enabled.

IsItemExpandable—Applies to view model properties that contain hierarchical (tree) structures. This specifies the name of an item property of type Boolean that indicates whether the item can be expanded to show children items.

IsItemExpanded—Applies to view model properties that contain hierarchical (tree) structures. This specifies the name of an item property of type Boolean that tells whether the item expanded state is enabled.

IsItemSelected—Applies to view model properties that contain hierarchical (tree) structures. This specifies the name of an item property of type Boolean that indicates whether the item selected state is enabled.

The annotation ViewLayout can define a layout group for the control. Different properties of the annotation ViewLayout include, but are not limited to the following properties.

Id—Identifies the layout group.

CaptionResourceId—String resource identifier for the layout group caption.

IsVisible—Name of another view model property of type Boolean that will show/hide the controls in the layout group based on its value.

Column—Grid column where the layout will appear on the view.

Width—The width of the grid column of the layout.

Figure 3:
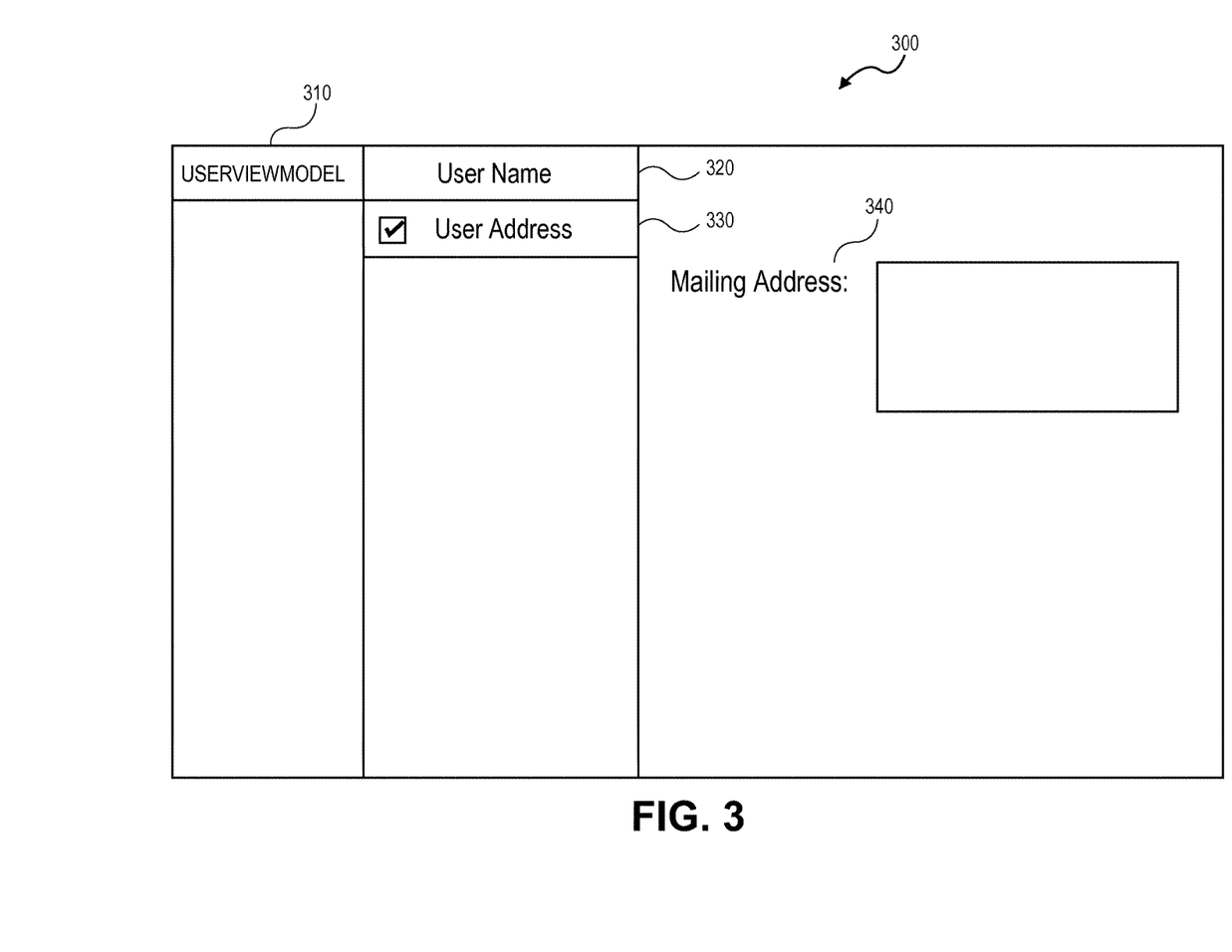
FIG. 3 is a diagram illustrating a web browser view, consistent with certain disclosed embodiments.

FIG. 3 is a diagram illustrating a web browser view, consistent with certain disclosed embodiments. As used herein, a web browser view is not limited to a view on a web browser, but can be any type of web-based view and/or view associated with a client/server communication (e.g. HTML view). Web browser view 300 can be generated based on source code for a desktop application, as described above. Web browser view 300 can include a first column that includes item 310. Item 310 represents a current view model being used, USERVIEWMODEL. In some embodiments, a user may be able to select view models using the web browser view, and the computing device may provide different web browser views based on the user's selections.

Web browser view 300 can include a second column that includes item 320 and item 330. Item 320 represents a property of the source code. In some embodiments, item 320 can be selectable by a user and can be bound to backend logic of the source code. For example, if a user were to select item 320, the computing device may generate a new web browser view that includes a text box for a user name.

In some embodiments, item 330 can be selectable by the user and can be bound to backend logic of the source code. For example, the user may have previously selected item 330, and, accordingly, the computing device may have generating the web browser view that includes item 340, a text box and a label. As shown in web browser view 300, item 330 is associated with a check box. The check box is checked, indicating that item 330 is selected and, accordingly, the web browser view that includes the text box and the label is currently displayed.

For example, the check box can be created based on an annotation that is bound to the Boolean value ProvideMailingAddress, as shown in line 208 of FIG. 2. Because ProvideMailingAddress is "enabled" the text box for the string MailingAddress was generated and displayed on the web browser of the user.

The text box of item 340 may be associated with a mailing address property (e.g. a string). Accordingly, if the user enters text into the text box, the text will be associated with the mailing address property.

The web browser view depicted in FIG. 3 represents a simplified version of a web browser view that can be generated as described herein, and is not intended to be limiting. The views, structures, properties, and labels depicted are merely for the purpose of illustration and are not intended to be limiting.

Figure 4:
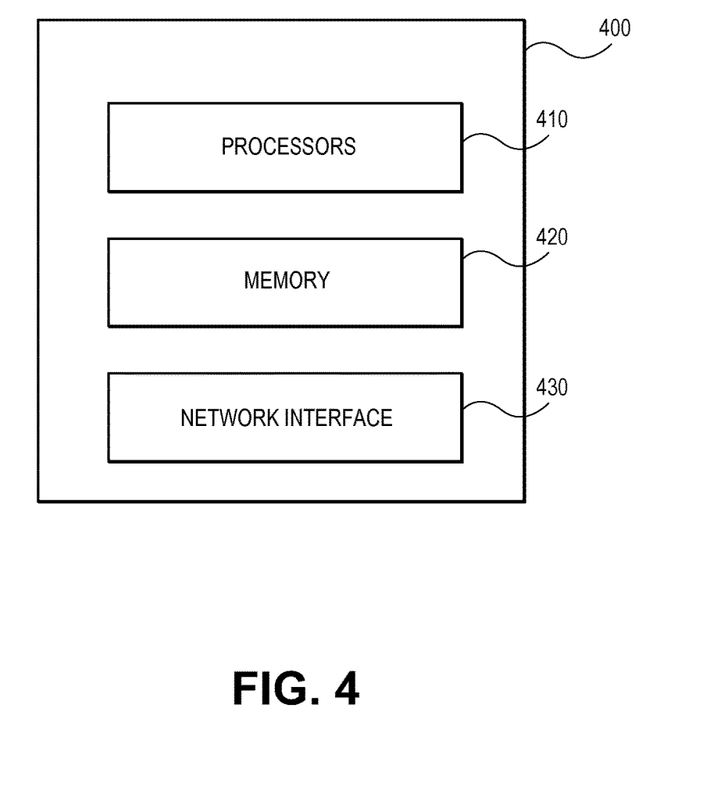
FIG. 4 is a diagram illustrating an exemplary hardware system for generating web browser views, consistent with certain disclosed embodiments.

FIG. 4 is a diagram illustrating an exemplary hardware system for generating web browser views, consistent with certain disclosed embodiments. Computing device 400 may represent any type of one or more computing devices.

Computing device 400 may include, for example, one or more microprocessors 410 of varying core configurations and clock frequencies; one or more memory devices or computer-readable media 420 of varying physical dimensions and storage capacities, such as flash drives, hard drives, random access memory, etc., for storing data, such as images, files, and program instructions for execution by one or more microprocessors 410; etc. One or more microprocessors 410, and one or more memory devices or computer-readable media 420 may be part of a single device as disclosed in FIG. 4 or may be contained within multiple devices.

Computing device 400 may also include, for example, network interface 430. Network interface can allow communication between computing device 400 and one or more additional computing devices via, for example, a local area network (LAN), a wide area network (WAN), and/or the Internet. For example computing device 400 may provide an HTML document to a client device via network interface 430 and may receive input from a user of the client device via network interface 430.

Those skilled in the art will appreciate that the above-described componentry is exemplary only, as computing device 400 may comprise any type of hardware componentry, including any necessary accompanying firmware or software, for performing the disclosed embodiments.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
    obtaining source code for a desktop application, wherein the source code comprises one or more properties;
    determining annotations associated with the one or more properties, wherein:
        the annotations describe display properties for the one or more properties,
        the annotations were not present in an original version of the source code,
        the annotations are within the source code and use a syntax associated with a programming language of the source code, and
        a first annotation of the annotations indicates a first variable is associated with a first display element, and
    generating a web view with the display properties based on the annotations, wherein generating the web view comprises:
        displaying the web view including one or more selectable view models,
        receiving a selection of the one or more selectable view models,
        displaying a different web view in response to the selection of the one or more selectable view models,
        displaying, in the different web view, one or more selectable items that correspond to the one or more properties in the source code,
        receiving a selection of the one or more selectable items, and
        updating the different web view to include a second display element corresponding to the selection of the one or more selectable items, wherein the second display element is displayed using the display properties described by the annotations associated with the one or more properties.

2. The method of claim 1, wherein at least one of the annotations describe data binding behavior, the method further comprising:
    receiving input from a user via the web view;
    performing backend logic based on the input and the source code, wherein the backend logic results in a change in a view; and
    updating the web view based on the change in the view.

3. The method of claim 1, wherein at least one of the annotations describe a class that inherits from a framework base class to specify a Uniform Resource Locator (URL) address to retrieve the web view.

4. The method of claim 1, further comprising:
    determining an annotation is associated with a property based on a position of the annotation relative to an invocation of the property.

5. The method of claim 1, wherein the programming language of the source code is compatible with one of the .NET Framework or the ASP .NET Framework.

6. The method of claim 1, wherein the web view is a web browser view.

7. The method of claim 1, wherein:
    at least one of the annotations specifies how at least one of the one or more properties are displayed,
    at least one of the annotations specifies how input from a user is received, and
    at least one of the annotations specifies how a display will be updated based on user input.

8. The method of claim 1, wherein the display element is selected from the group consisting of a text box and a check box.

9. The method of claim 1, wherein the method further comprises determining a model class and a view model class in the desktop application, wherein the model class represents business logic or backend logic, wherein the view model class represents presentation logic, and wherein the model class and the view model class are determined based on the annotations in the source code.

10. A system comprising:
    a processing system comprising one or more processors; and
    a memory system comprising one or more computer-readable media, wherein the one or more computer-readable media contain instructions that, when executed by the processing system, cause the processing system to perform operations comprising:
        obtaining source code for a desktop application, wherein the source code comprises one or more properties;
        determining annotations associated with the one or more properties, wherein:
            the annotations describe display properties for the one or more properties,
            the annotations were not present in an original version of the source code,
            the annotations are within the source code and use a syntax associated with a programming language of the source code, and
            a first annotation of the annotations indicates a first variable is associated with a first display element, and generating a web view with the display properties based on the annotations, wherein generating the web view comprises:
  displaying the web view including one or more selectable view models,
  receiving a selection of the one or more selectable view models,
  displaying a different web view in response to the selection of the one or more selectable view models,
  displaying, in the different web view, one or more selectable items that correspond to the one or more properties in the source code,
  receiving a selection of the one or more selectable items, and
  updating the different web view to include a second display element corresponding to the selection of the one or more selectable items, wherein the second display element is displayed using the display properties described by the annotations associated with the one or more properties.

11. The system of claim 10, wherein at least one of the annotations describe data binding behavior, the operations further comprising:
  receiving input from a user via the web view;
  performing backend logic based on the input and the source code, wherein the backend logic results in a change in a view; and
  updating the web view based on the change in the view.

12. The system of claim 10, wherein at least one of the annotations describe a class that inherits from a framework base class to specify a Uniform Resource Locator (URL) address to retrieve the web view.

13. The system of claim 10, the operations further comprising:
  determining an annotation is associated with a property based on a position of the annotation relative to an invocation of the property.

14. The system of claim 10, wherein the programming language of the source code is compatible with one of the .NET Framework or the ASP .NET Framework.

15. The system of claim 10, wherein the web view is a web browser view.

16. The system of claim 10, wherein:
  at least one of the annotations specifies how at least one of the one or more properties are displayed,
  at least one of the annotations specifies how input from a user is received, and
  at least one of the annotations specifies how a display will be updated based on user input.

17. A non-transitory computer-readable medium containing instructions embodied thereon, wherein the instructions, when executed by a processor, cause the processor to perform operations comprising:
  obtaining source code for a desktop application, wherein the source code comprises one or more properties;
  determining annotations associated with the one or more properties, wherein:
    the annotations describe display properties for the one or more properties,
    the annotations were not present in an original version of the source code,
    the annotations are within the source code and use a syntax associated with a programming language of the source code, and
    a first annotation of the annotations indicates a first variable is associated with a first display element, and
  generating a web view with the display properties based on the annotations, wherein generating the web view comprises:
    displaying the web view including one or more selectable view models,
    receiving a selection of the one or more selectable view models,
    displaying a different web view in response to the selection of the one or more selectable view models,
    displaying, in the different web view, one or more selectable items that correspond to the one or more properties in the source code,
    receiving a selection of the one or more selectable items, and
    updating the different web view to include a second display element corresponding to the selection of the one or more selectable items, wherein the second display element is displayed using the display properties described by the annotations associated with the one or more properties.

18. The non-transitory computer-readable medium of claim 17, wherein at least one of the annotations describe data binding behavior, the operations further comprising:
  receiving input from a user via the web view;
  performing backend logic based on the input and the source code, wherein the backend logic results in a change in a view; and
  updating the web view based on the change in the view.

19. The non-transitory computer-readable medium of claim 17, wherein at least one of the annotations describe a class that inherits from a framework base class to specify a Uniform Resource Locator (URL) address to retrieve the web view.

20. The non-transitory computer-readable medium of claim 17, the operations further comprising:
  determining an annotation is associated with a property based on a position of the annotation relative to an invocation of the property.

21. The non-transitory computer-readable medium of claim 17, wherein the web view is a web browser view.

22. The non-transitory computer-readable medium of claim 17, wherein:
  at least one of the annotations specifies how at least one of the one or more properties are displayed,
  at least one of the annotations specifies how input from a user is received, and
  at least one of the annotations specifies how a display will be updated based on user input.

* * * * *